(12) United States Patent
McDermott

(10) Patent No.: US 7,445,331 B2
(45) Date of Patent: Nov. 4, 2008

(54) EYEGLASSES WITH INTEGRAL FOLDING CASE

(76) Inventor: Elizabeth Ann McDermott, 5051 Justin Dr., NW., Albuquerque, NM (US) 87114-4312

( * ) Notice: Subject to any disclaimer, the term of this patent is extended or adjusted under 35 U.S.C. 154(b) by 0 days.

(21) Appl. No.: 11/828,859

(22) Filed: Jul. 26, 2007

(65) Prior Publication Data
US 2008/0002143 A1 Jan. 3, 2008

Related U.S. Application Data

(62) Division of application No. 11/113,634, filed on Apr. 22, 2005.

(60) Provisional application No. 60/565,132, filed on Apr. 23, 2004.

(51) Int. Cl.
*G02C 5/08* (2006.01)

(52) U.S. Cl. ............ 351/63; 351/111; 351/158

(58) Field of Classification Search ........ 351/63, 351/111, 153, 158
See application file for complete search history.

(56) References Cited

U.S. PATENT DOCUMENTS

| | | | |
|---|---|---|---|
| 654,005 A | 7/1900 | Kabisch | |
| 1,297,019 A | 3/1919 | Seckendorf | |
| 1,838,494 A | 12/1931 | Neuwirth | |
| 1,899,664 A | 2/1933 | Blocker | |
| 3,323,638 A | 6/1967 | Dishart | |
| 4,707,088 A | 11/1987 | Tabacchi | |
| 4,887,896 A * | 12/1989 | Akagi | 351/63 |
| 5,151,720 A | 9/1992 | Kanbar | |
| 5,937,681 A | 8/1999 | Myhr et al. | |
| D413,504 S | 9/1999 | Kung et al. | |
| 5,956,985 A | 9/1999 | Chang | |
| 6,102,541 A * | 8/2000 | Kuo | 351/63 |
| 6,406,144 B1 | 6/2002 | Waters | |
| D465,425 S | 11/2002 | Chang | |
| 6,502,936 B2 | 1/2003 | Keene | |
| 6,582,097 B2 | 6/2003 | Chang | |
| 6,709,127 B2 * | 3/2004 | Lu | 362/109 |
| 2003/0002277 A1 | 1/2003 | Lu | |
| 2003/0063253 A1 | 4/2003 | Keene | |
| 2004/0032652 A1 | 2/2004 | Holmes et al. | |

OTHER PUBLICATIONS

Et al., "Folding Spectacles", http:\\www.optimaxchina.com/folding_glasses.htm , 1.

* cited by examiner

*Primary Examiner*—Huy K Mai
(74) *Attorney, Agent, or Firm*—Philip D. Askenazy; Peacock Myers, P.C.

(57) ABSTRACT

Eyeglasses having an integral case. The eyeglasses may swivel or slide out from a protective case. An attachment mechanism, such as a clip, may be integrated with the case. A file or other personal care item may also be integrated with the case or frame. In another embodiment, the earpieces of the eyeglasses can be folded to cover at least a majority of the surface area of the lenses.

20 Claims, 16 Drawing Sheets

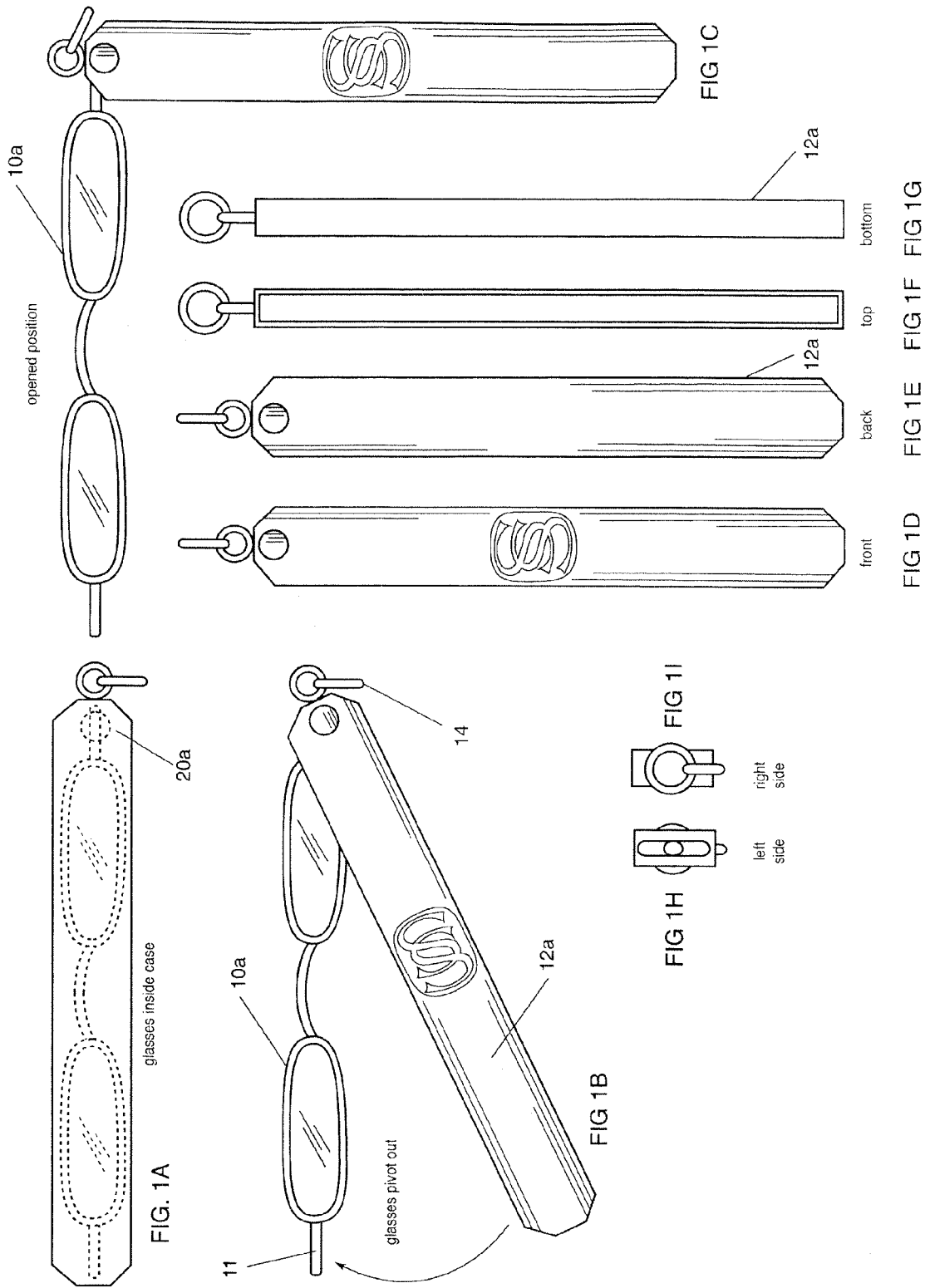

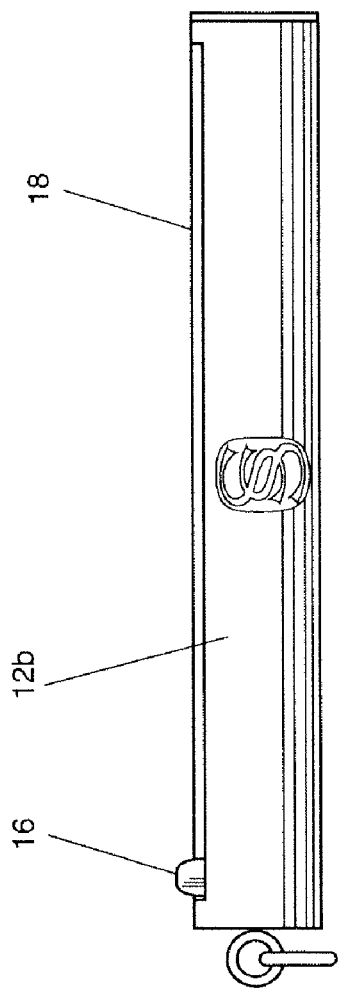
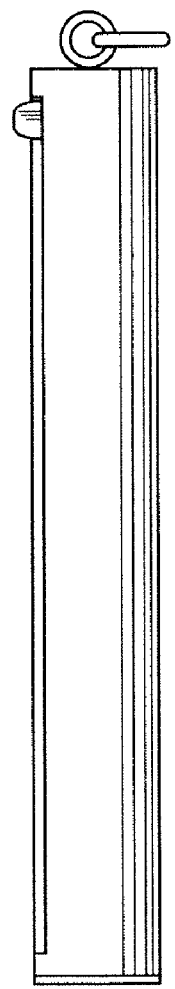
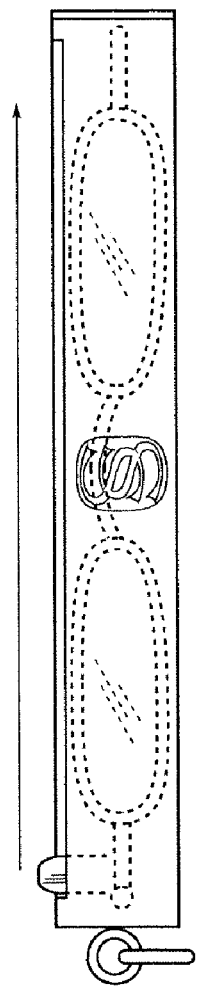
FIG. 2A
FIG. 2B
FIG. 2C

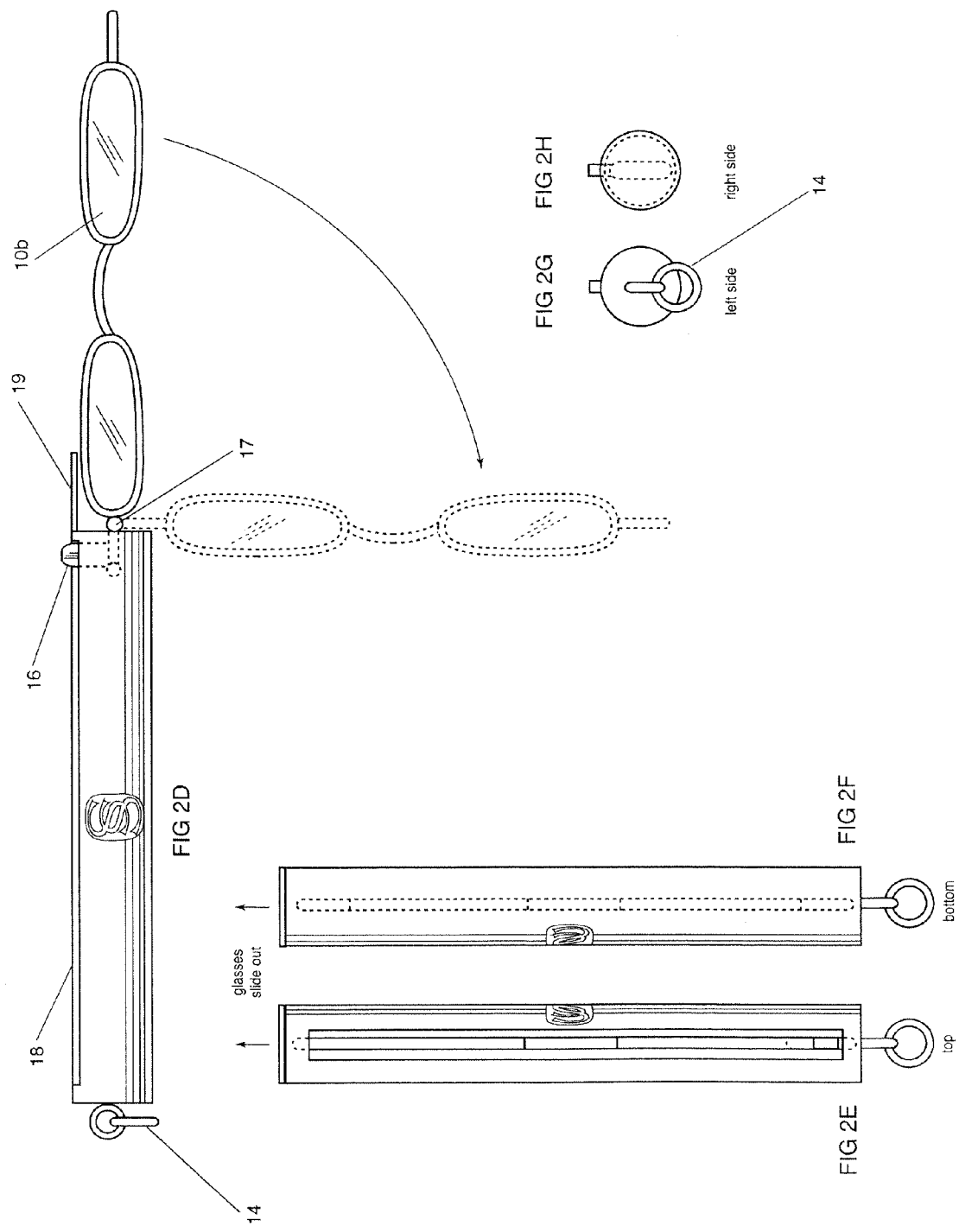

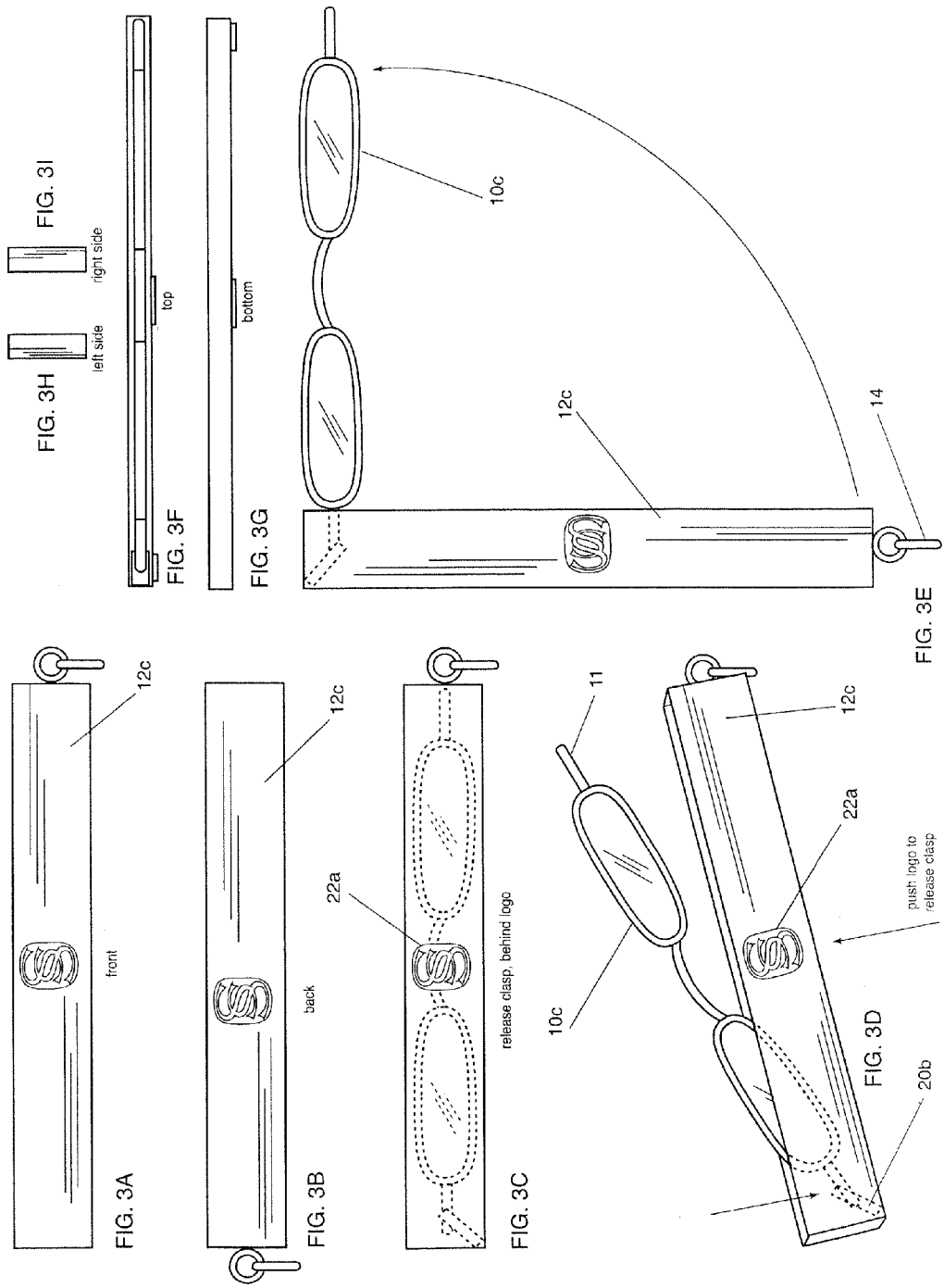

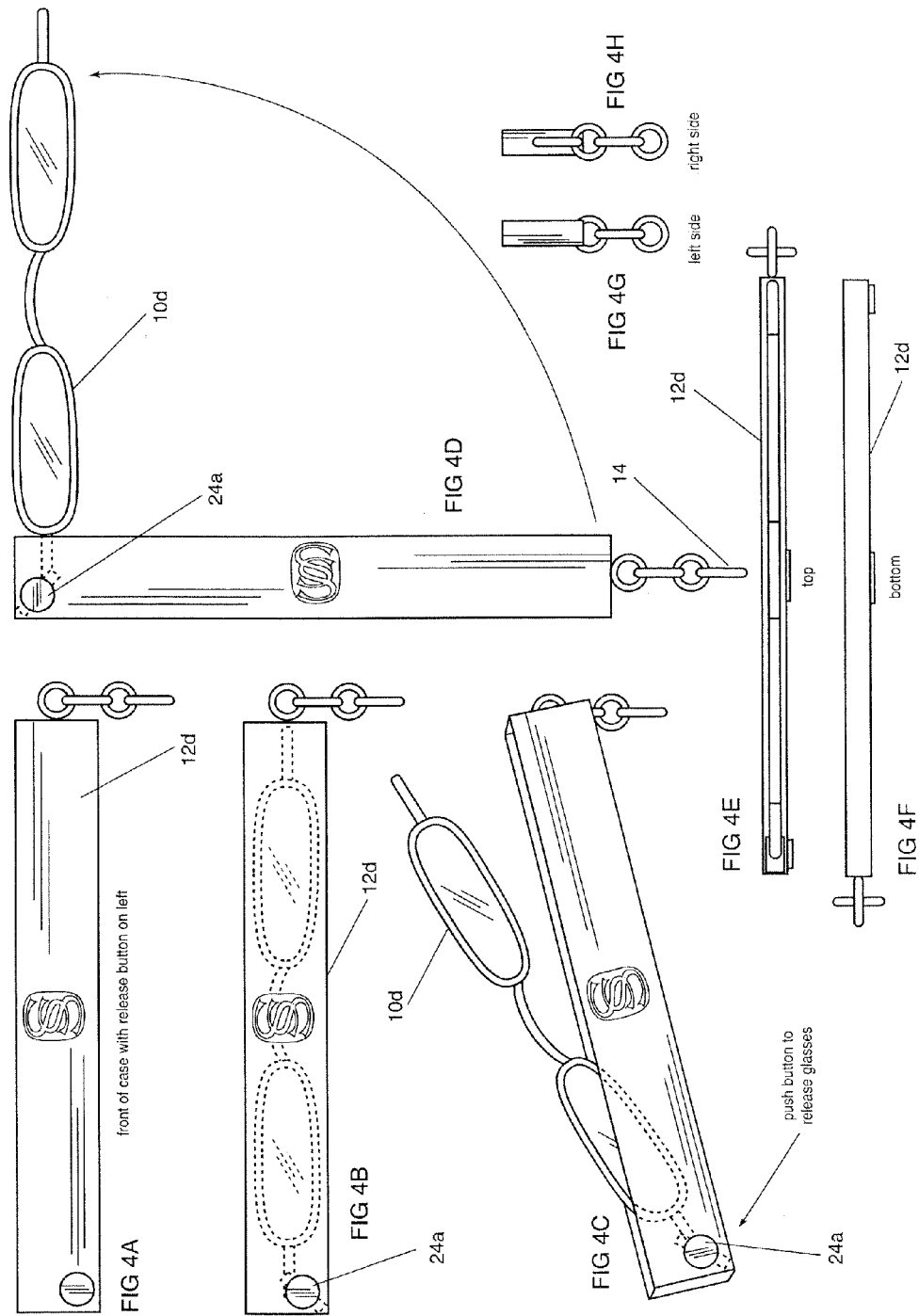

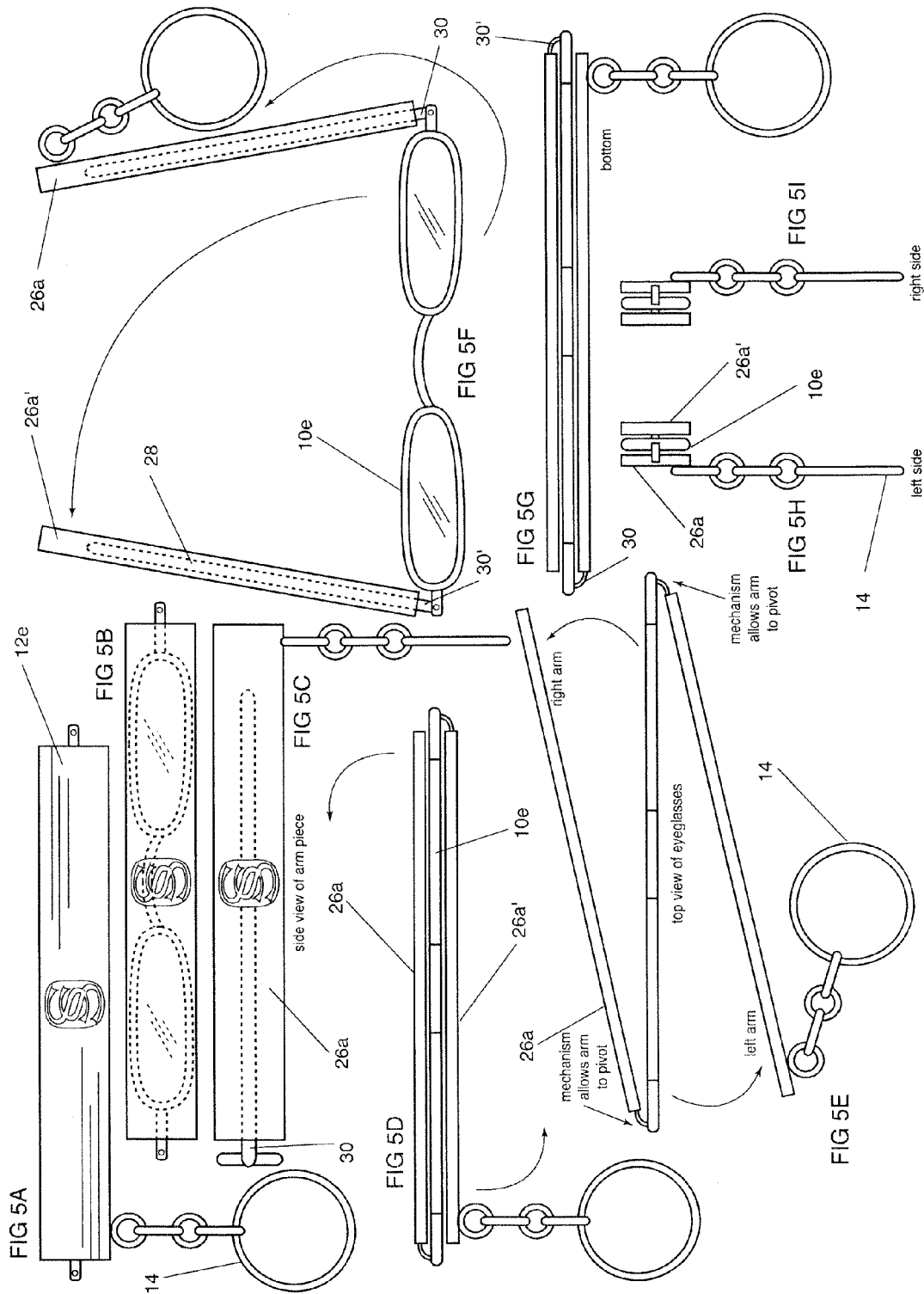

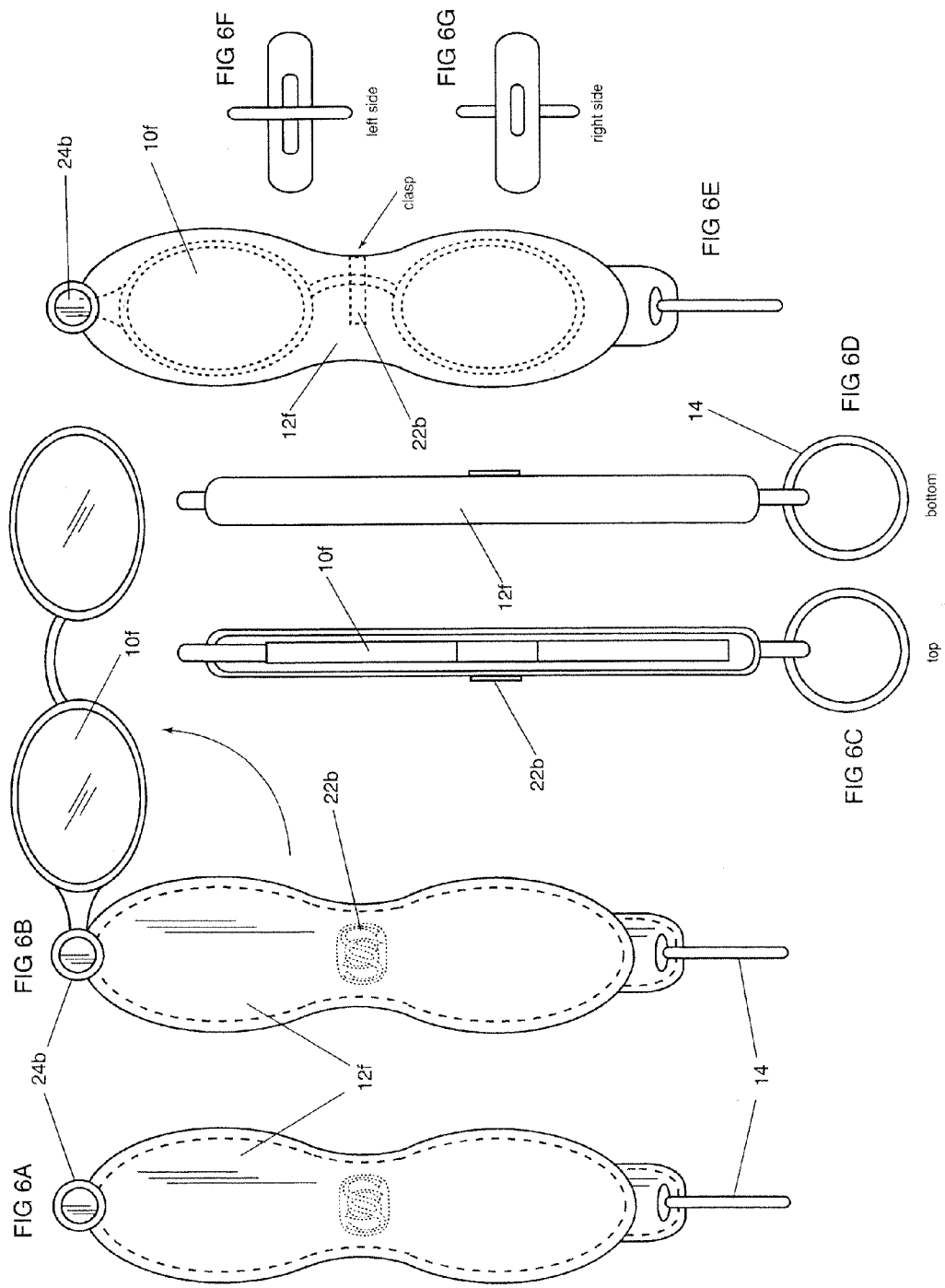

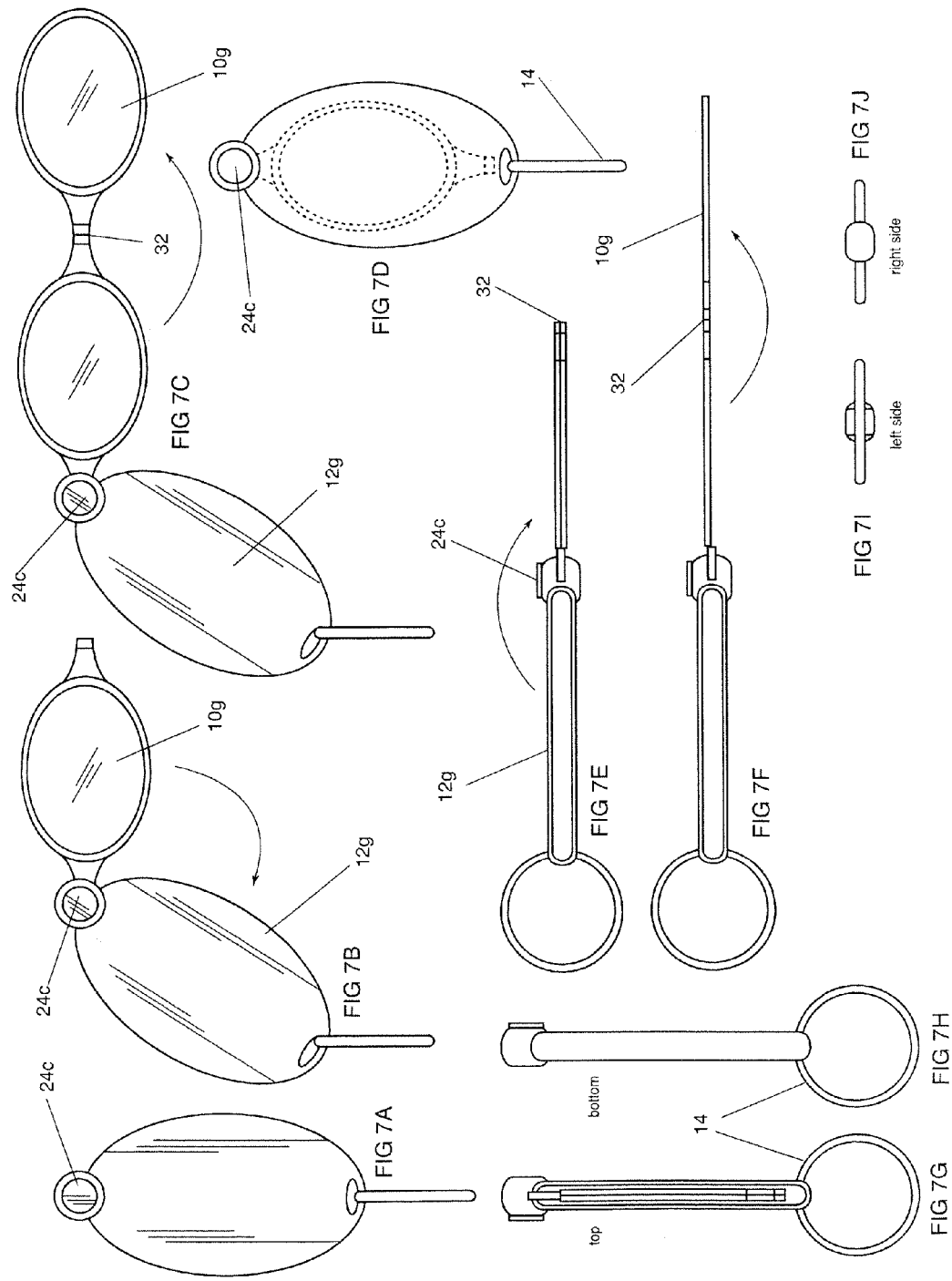

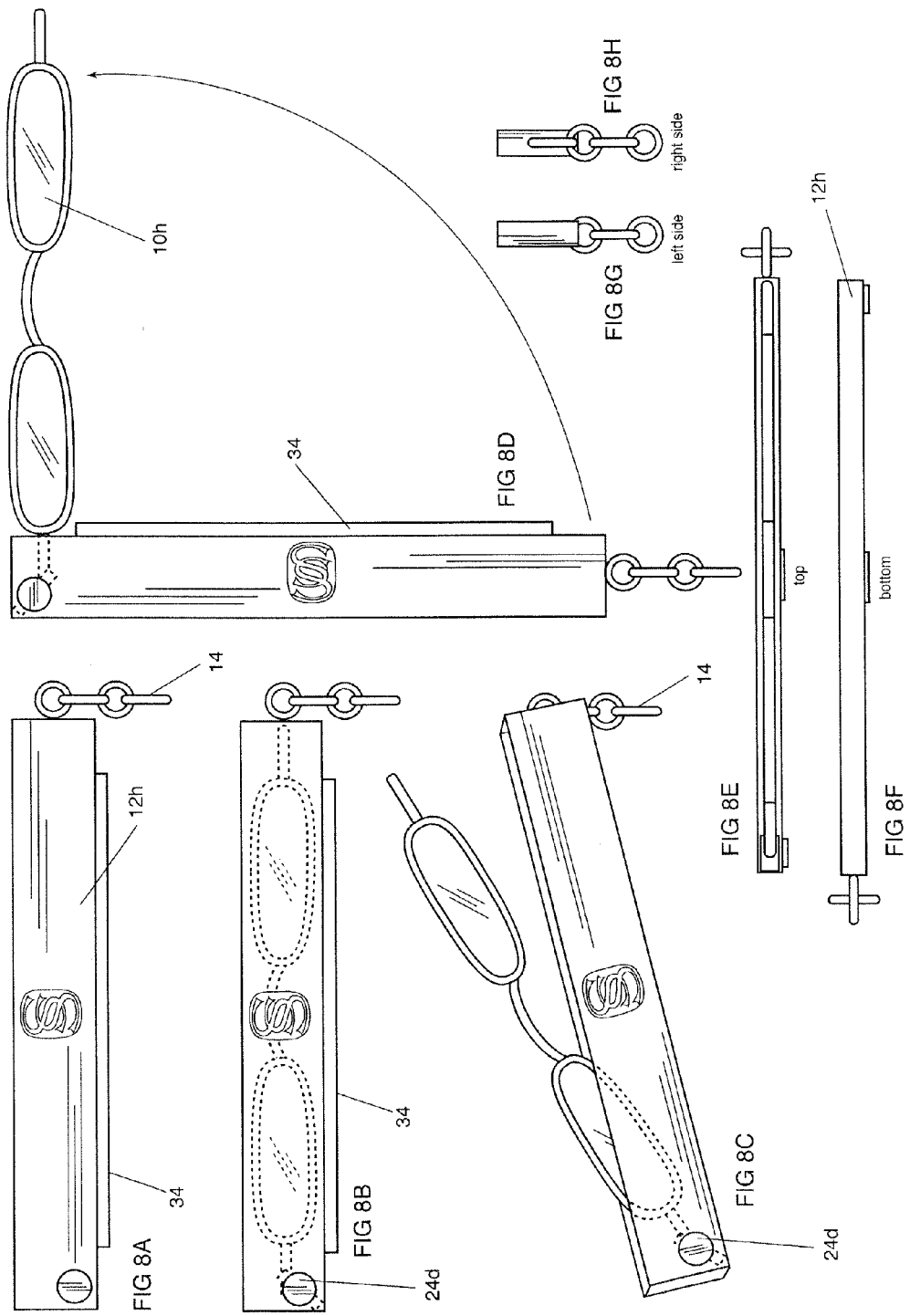

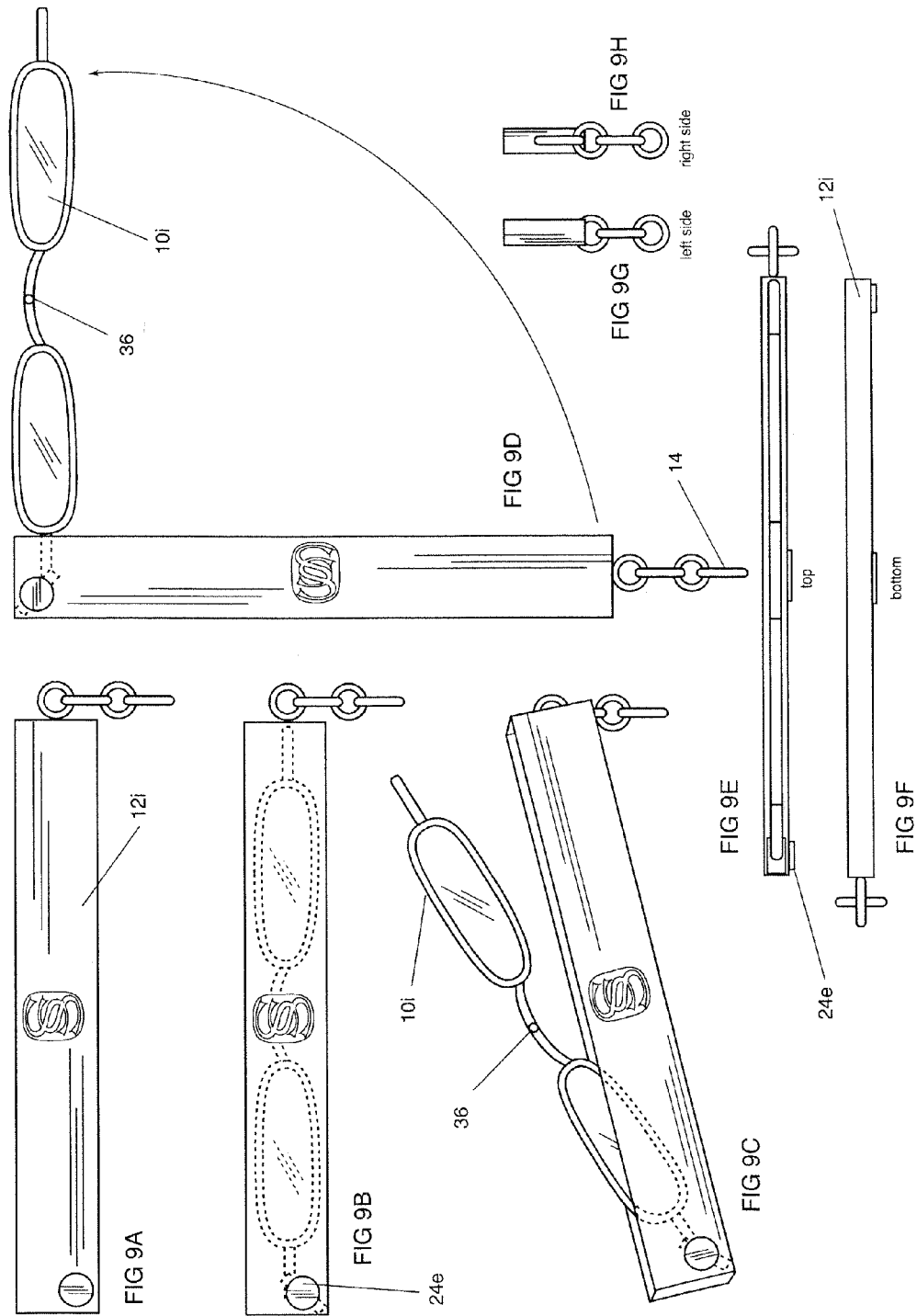

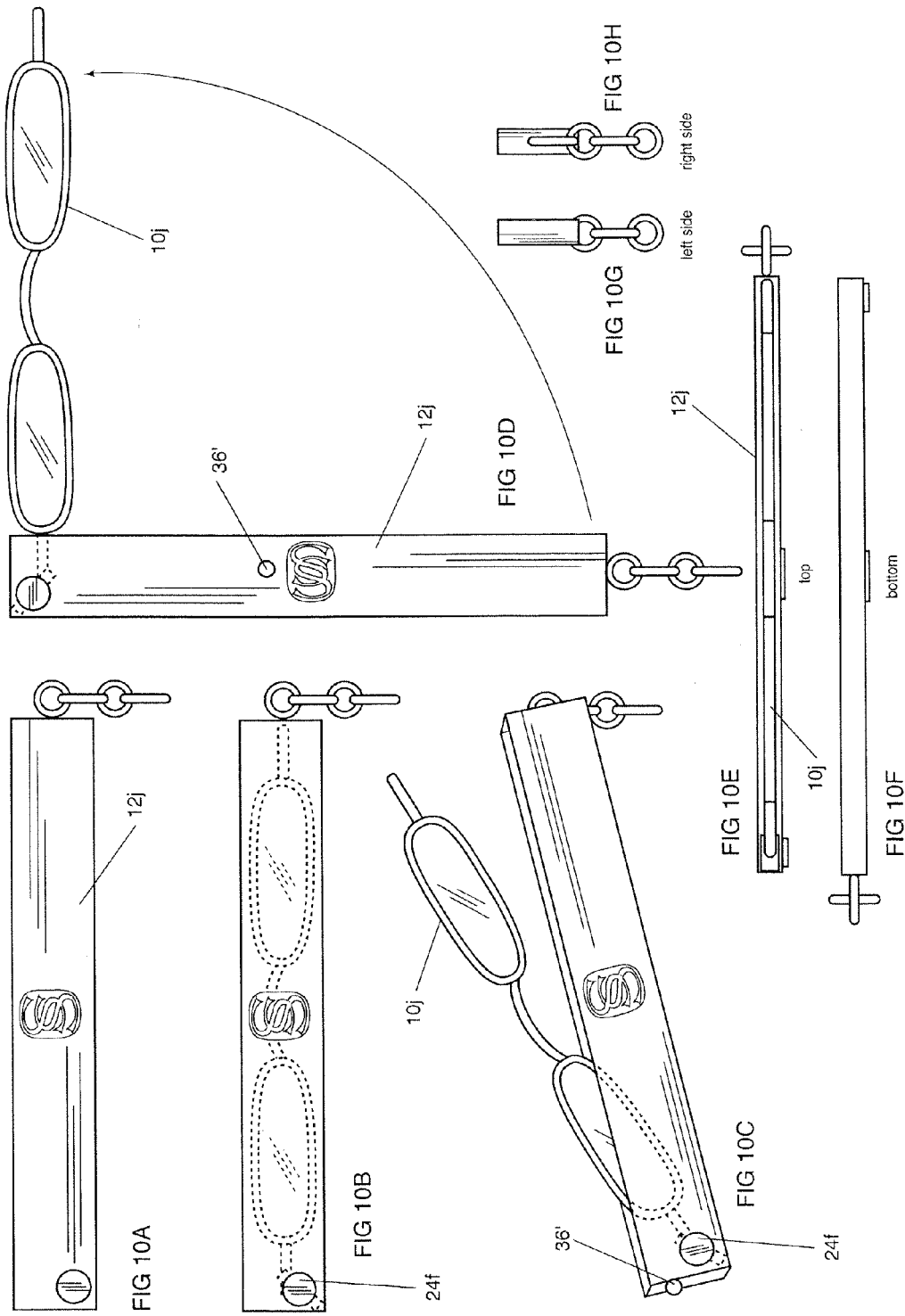

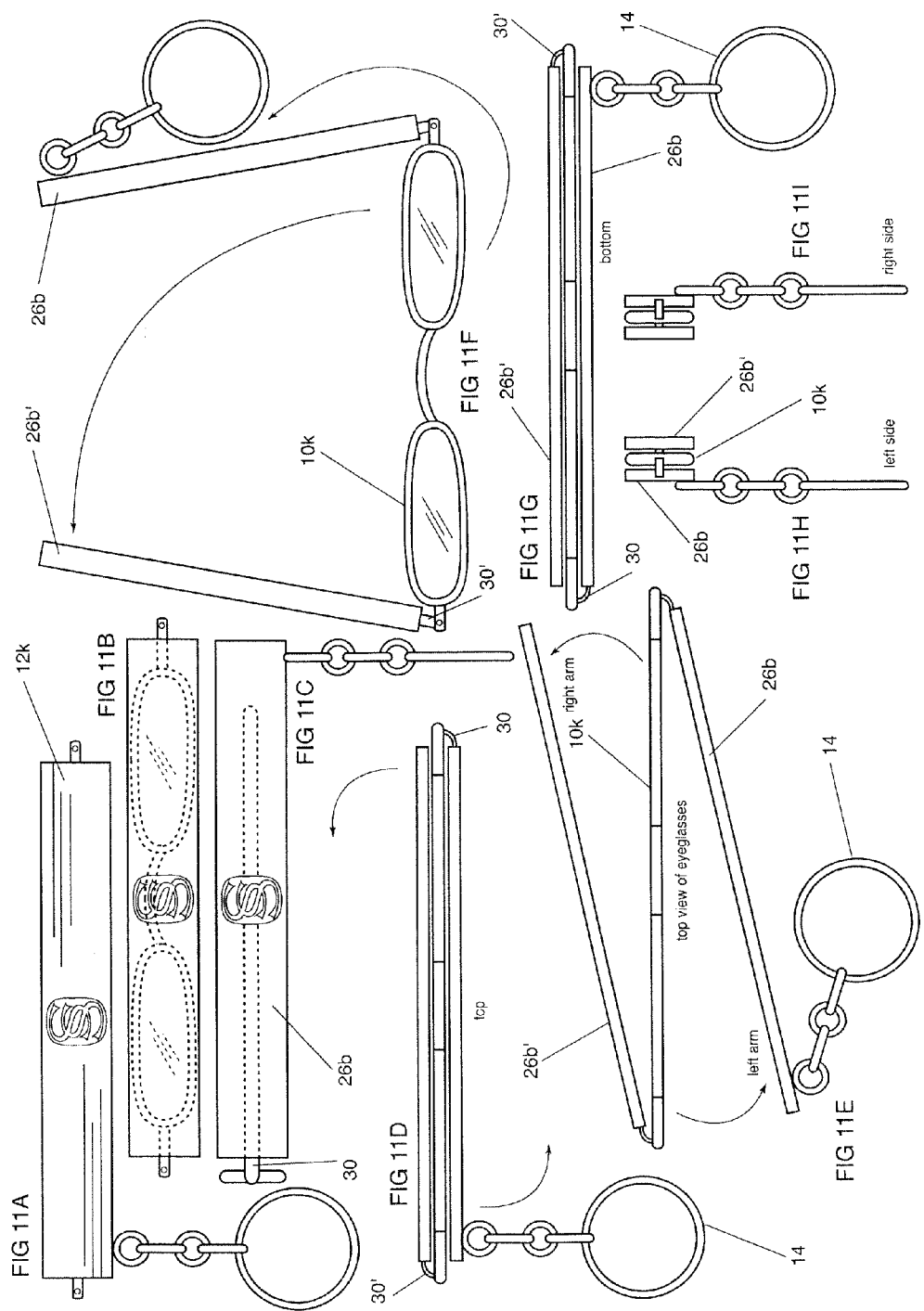

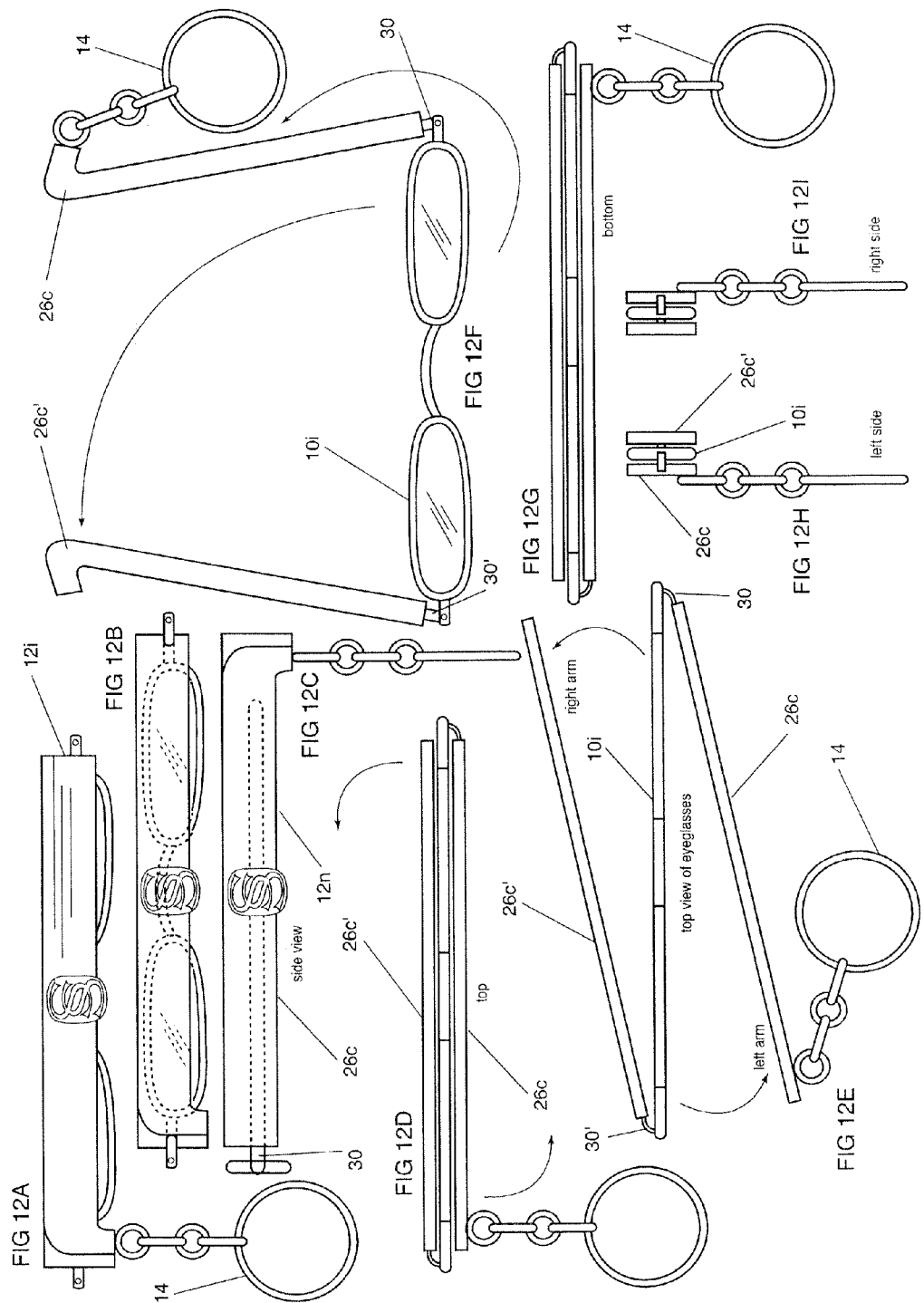

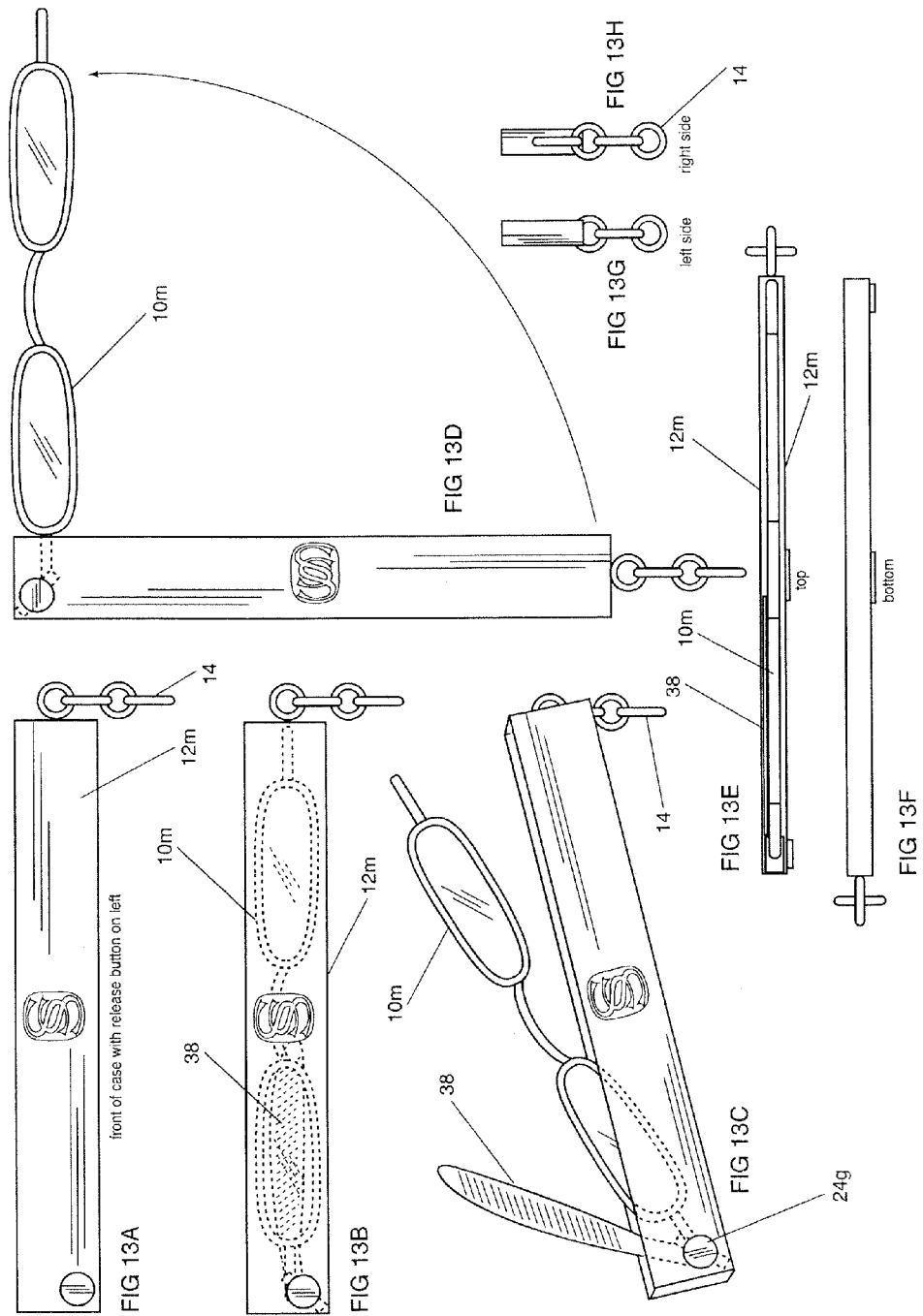

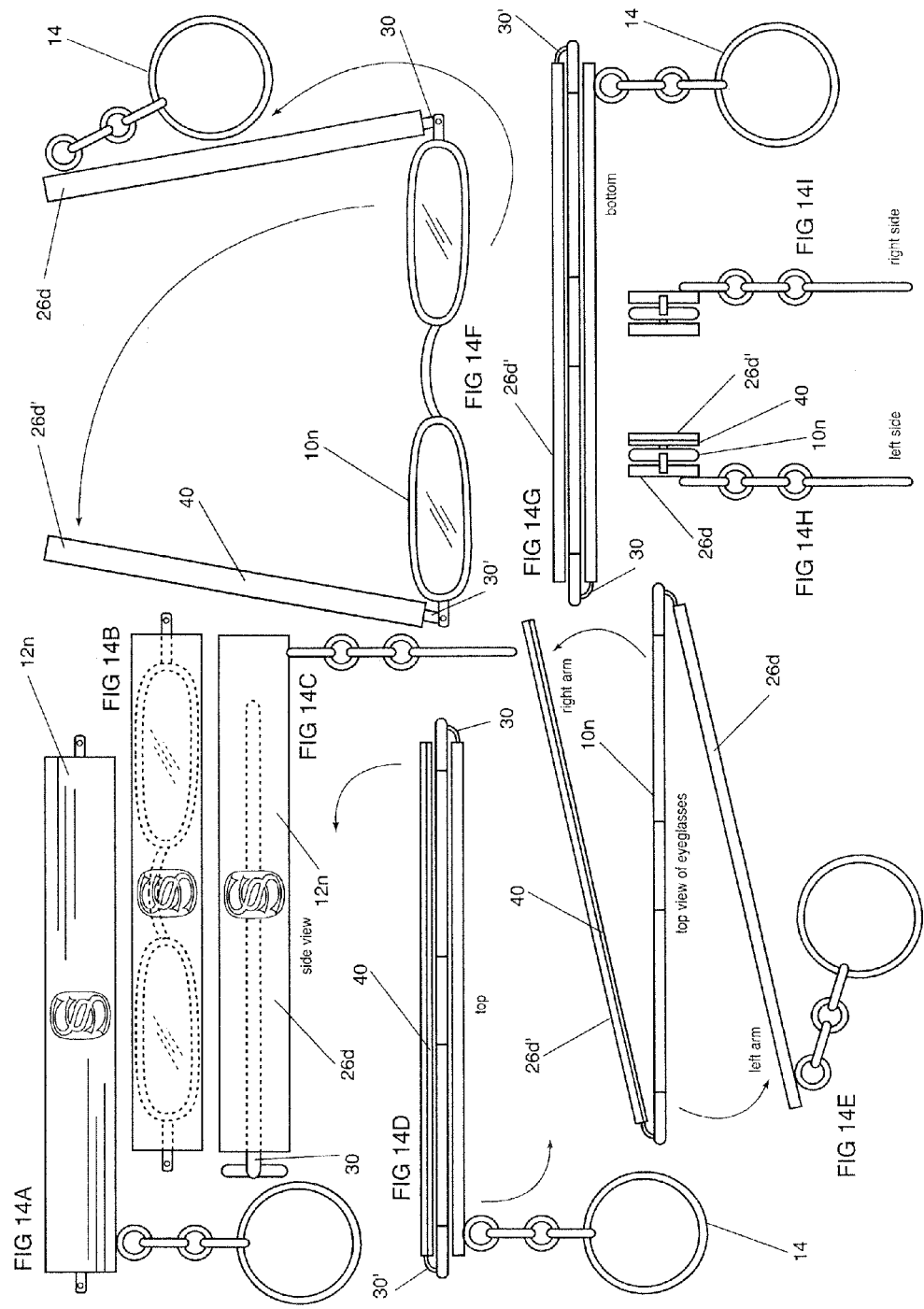

EYEGLASSES WITH INTEGRAL FOLDING CASE

CROSS-REFERENCE TO RELATED APPLICATIONS

This application is a divisional application of U.S. patent application Ser. No. 11/113,634, entitled "Eyeglasses with Integral Case", filed on Apr. 22, 2005, which application claims priority to and the benefit of the filing of U.S. Provisional Patent Application Ser. No. 60/565,132, entitled "Reading Glasses and Case", filed on Apr. 23, 2004. The specifications and claims thereof are incorporated herein by reference.

BACKGROUND OF THE INVENTION

1. Field of the Invention (Technical Field)

The present invention relates to eye glasses. Particularly, the present invention relates to reading glasses having an integral case.

2. Description of Related Art

Note that the following discussion refers to a number of publications and references. Discussion of such publications herein is given for more complete background of the scientific principles and is not to be construed as an admission that such publications are prior art for patentability determination purposes.

Foldable eyeglasses are well known. Examples include U.S. Pat. Nos. 1,899,664, 6,406,144, 1,297,019; and those described at www.optimaxchina.com/folding_glasses.htm. Other inventions are known which provide a magnifying glass which pivots away from its holder. Examples of these include U.S. Pat. No. Des 413,504; U.S. Pat. Nos. 6,502,936; and 1,838,494. The problem with inventions which provide a magnifying glass which pivots away from its holder is that they do not provide a single frame within which a plurality of lenses are disposed. As such, use of such a magnifying glass does not stereoscopically enhance a user's vision. Another problem that is often encountered with known foldable eyeglasses is that a user who requires reading glasses needs to keep reading glasses with them virtually anytime to prevent having to look for them or lose them.

Users of glasses typically need their glasses with them at all times. Nail files are often used on a regular basis. Incorporating a nail file or the like into a compact pair of glasses, which is attachable to an object, not only enables a user to keep the glasses with them more easily, but also provides a user with the added benefit of also having a file readily available.

None of the prior art foldable glasses provide a user with the ability to attach the eyeglasses to an item. Also, none of the prior art foldable glasses provide a user with a file. There is thus a present need for a pair of foldable glasses which comprises an attachment mechanism and which further optionally provides a user with a file incorporated with or otherwise connected to the eyeglasses. Finally, none of the prior art eyeglasses comprise a case which is integrally incorporated with the ear pieces, such that the earpieces of the eyeglasses themselves fold to cover all, or substantially all of the lens surfaces.

BRIEF SUMMARY OF THE INVENTION

The present invention is a combination eyeglasses and case comprising a frame comprising a plurality of lenses, a case for substantially enclosing the frame, a connection between the frame and the case for enabling the frame to move relative to the case, and an attachment mechanism. The case optionally comprises a file, which optionally is integrated into the surface area of the case or movably positionable with respect to the case. The connection preferably comprises either a pivot with the frame being rotatable into and out of the case or a sliding mechanism with the frame being slideable into and out of the case. In the latter case, the frame is preferably rotatable with respect to the case after sliding out of the case. The frame preferably further comprises a protrusion for assisting in moving the frame with respect to the case.

The combination eyeglasses and case optionally further comprises a spring mechanism for at least partially ejecting the frame from the case and a release mechanism for activating the spring mechanism. The release mechanism preferably is substantially axially aligned with a pivot point and/or preferably comprises a logo. The combination eyeglasses and case optionally comprises a light emitting source. The case optionally comprises a shape approximately conforming to a shape of the frame. The frame preferably comprises a hinge for folding the frame, in which instance the case preferably comprises a size and a shape approximately that of one of the lenses.

The present invention is also a combination eyeglasses and case comprising a frame comprising a plurality of lenses, a case for substantially enclosing the frame, a connection between the frame and the case for enabling the frame to move relative to the case, a spring mechanism for at least partially ejecting the frame from the case, a release mechanism for activating the spring mechanism. The release mechanism is preferably substantially axially aligned with the pivot point and/or preferably comprises a logo. The combination eyeglasses and case of claim 16 further comprises an element selected from the group consisting of file, light emitting source, and attachment mechanism.

The present invention is also a combination eyeglasses and case comprising a frame comprising a plurality of lenses and one or more leaf members pivotally connected to the frame, the leaf members sufficiently large to cover a majority of the surface area of the lenses. Each of the leaf members preferably either comprises an earpiece or encloses an earpiece. In the latter instance the leaf members are preferably removable from the earpieces. The combination eyeglasses and case preferably further comprises an element selected from the group consisting of file, light emitting source, and attachment mechanism. The file is preferably incorporated into a surface area of at least one leaf member.

A primary object of the present invention is to provide a pair of reading glasses which are readily transportable and which provide a user the ability to secure them to an item, such as an article of the user's clothing, thus decreasing the chances that the glasses will be unavailable when needed by a user.

Another object of the present invention provides a user not only with eyeglasses comprising the above described useful features, but further provides a user with a file, such as a nail file, or other personal care item which is attached to or otherwise incorporated into the eyeglasses of the present invention.

A further object of the present invention is to provide a folding eyeglass/case combination that has an integrated attachment mechanism, permitting it to be easily carried with the user.

A primary advantage of the present invention is that a case for preventing scratches or other damage to the eyeglasses is integral with the frame of the eyeglasses.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 1A-C are drawings which show a front view an embodiment of the present invention wherein a pair of glasses are pivotally connected to a case;

FIGS. 1D-I are drawings depicting front, back, top, bottom, left side, and right side view drawings respectively and show an embodiment of the present invention wherein a pair of glasses are pivotally connected to a case;

FIGS. 2A-D are drawings depicting front and back views which show an embodiment of the present invention wherein a pair of glasses are movably attached to, and slideably removable from, a case;

FIGS. 2E-H are top, bottom, left side, and right side view drawings which show an embodiment of the present invention wherein a pair of glasses are movably attached to, and slideably removable from, a case;

FIGS. 3A-C are drawings depicting front and back side views which show an embodiment of the present invention wherein glasses which are pivotally connected to a case are stowed within the case and wherein a logo conceals a clasp which prevents rotation of the glasses with respect to the case;

FIG. 3D is a perspective view drawing showing an embodiment of the present invention wherein a pair of glasses that are pivotally connected to a case are partially contained within the case and wherein a logo conceals a clasp which prevents rotation of the glasses with respect to the case;

FIGS. 3E-I are drawings depicting front, top, bottom, left side, and right side views of an embodiment of the present invention wherein a pair of glasses are pivotally connected to a case and wherein a logo conceals a clasp which prevents rotation of the glasses with respect to the case;

FIGS. 4A, and B are front view drawings which show an embodiment of the present invention wherein a pair of glasses are pivotally attached to a case and wherein a spring is provided for urging a rotational force to the glasses and wherein a release button is provided to secure the glasses within the case;

FIG. 4C is a perspective view drawing which show an embodiment of the present invention wherein a pair of glasses are pivotally attached to a case and wherein a spring is provided for urging a rotational force to the glasses and wherein a release button is provided to secure the glasses within the case;

FIGS. 4D-H are drawings which show front, top, bottom, left side, and right side views of an embodiment of the present invention wherein a pair of glasses are pivotally attached to a case and wherein a spring is provided for urging a rotational force to the glasses and wherein a release button is provided to secure the glasses within the case;

FIGS. 5A-C are front view drawings which show an embodiment of the present invention wherein a pair of glasses are sandwiched between movable encasement leaves which are removably attached to earpieces connected to the glasses;

FIGS. 5D-F are drawings depicting a progression wherein encasement leaves, which are removably attached to earpieces connected to the glasses, are unfolded away from a pair of glasses according to an embodiment of the present invention;

FIGS. 5G-I are drawings showing bottom, left side, and right side view drawings of embodiment of the present invention wherein a pair of glasses are sandwiched between movable encasement leaves which are removably attached to earpieces connected to the glasses;

FIGS. 6A-G are drawings depicting front, top, bottom, right side, and left side views of an embodiment of the present invention wherein glasses which are pivotally connected to a case are stowed within the case and wherein a logo conceals a clasp which prevents rotation of the glasses with respect to the case;

FIGS. 7A-D are drawings depicting front views of an embodiment of the present invention wherein a pair of foldable glasses are pivotally connected to a case, and wherein a spring for urging a rotational force, as well as a release button are provided;

FIGS. 7E-I, and J are drawings which show top and side views of an embodiment of the present invention wherein a pair of foldable glasses are pivotally connected to a case, and wherein a spring for urging a rotational force, as well as a release button are provided;

FIGS. 8A-D are front view drawings which show an embodiment of the present invention wherein a pair of glasses are pivotally connected to a case and wherein a nail file is provided and fixedly secured to, or otherwise incorporated within, the case;

FIGS. 8E-H are top, bottom, left, and right side views of an embodiment of the present invention wherein a pair of glasses are pivotally connected to a case and wherein a nail file is provided and fixedly secured to, or otherwise incorporated within, the case;

FIGS. 9A-D are front view drawings which show an embodiment of the present invention wherein a pair of glasses are pivotally connected to a case and wherein an illuminating device, such as a Light Emitting Diode ("LED"), is fixedly secured to, or otherwise incorporated within, the glasses;

FIGS. 9E-H are top, bottom, left, and right side views of an embodiment of the present invention which show a pair of glasses are pivotally connected to a case and wherein an illuminating device, such as a Light Emitting Diode ("LED"), is fixedly secured to, or otherwise incorporated within, the glasses;

FIGS. 10A-D are front view drawings which show an embodiment of the present invention wherein a pair of glasses are pivotally connected to a case and wherein an illuminating device, such as a Light Emitting Diode ("LED"), is fixedly secured to, or otherwise incorporated within, the case;

FIGS. 10E-H are top, bottom, left, and right side views of an embodiment of the present invention which show a pair of glasses are pivotally connected to a case and wherein an illuminating device, such as a Light Emitting Diode ("LED"), is fixedly secured to, or otherwise incorporated within, the case;

FIGS. 11A-C are front view drawings which show an embodiment of the present invention wherein a pair of glasses are sandwiched between movable encasement leaves;

FIGS. 11D-F are drawings depicting a progression wherein encasement leaves are unfolded away from a pair of glasses according to an embodiment of the present invention;

FIGS. 11G-I are drawings showing bottom, left side, and right side view drawings of embodiment of the present invention wherein a pair of glasses are sandwiched between movable encasement leaves;

FIGS. 12A-C are front view drawings which show an embodiment of the present invention wherein a pair of glasses are sandwiched between movable encasement leaves which comprise a curved or otherwise hooked end;

FIGS. 12D-F are drawings depicting a progression wherein encasement leaves, which comprise a curved or otherwise hooked end, are unfolded away from a pair of glasses according to an embodiment of the present invention;

FIGS. 12G-I are drawings showing bottom, left side, and right side view drawings of embodiment of the present invention wherein a pair of glasses are sandwiched between movable encasement leaves which comprise a curved or otherwise hooked end;

FIGS. 13A-D are front view drawings which show an embodiment of the present invention wherein a pair of glasses are pivotally connected to a case and wherein a nail file is pivotally connected to the case;

FIGS. 13E-H are top, bottom, left, and right side views of an embodiment of the present invention which show a pair of glasses are pivotally connected to a case and wherein a nail file is pivotally connected to the case;

FIGS. 14A-C are front view drawings which show an embodiment of the present invention wherein a pair of glasses are sandwiched between movable encasement leaves, one or both of which comprise a nail file fixedly secured to, or otherwise incorporated in the leaf;

FIGS. 14D-F are drawings depicting a progression wherein encasement leaves are unfolded away from a pair of glasses according to an embodiment of the present invention, one or both of which comprise a nail file fixedly secured to, or otherwise incorporated in the leaf;

FIGS. 14G-I are drawings showing bottom, left side, and right side view drawings of embodiment of the present invention wherein a pair of glasses are sandwiched between movable encasement leaves, one or both of which comprise a nail file fixedly secured to, or otherwise incorporated in the leaf.

DETAILED DESCRIPTION OF THE INVENTION

Figure 15B:
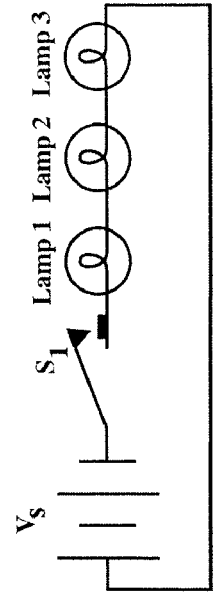
FIGS. 15A-D are schematic representations depicting circuits which can be used in accordance with one or more embodiments of the present invention.

The various elements of the present invention can be made from any material or combinations of materials known to those skilled in the art to provide desirable results for each of their respective functions.

The term "attachment mechanism", as used throughout the specification and claims is intended to include any and all attachment mechanisms including, but not limited to, carabiners, hooks, leashes, lanyards, clips, hook and loop tape, keychains, key rings, other fastening devices and/or combinations of these which provide a user the ability to readily attach the glasses of the present invention to one or more items. The attachment mechanisms of the present invention can be located at any appropriate area on any and all embodiments of the present invention, regardless of their depicted position. The attachment mechanisms of the present invention can be made from metals, plastics, woods, other suitable materials, and/or combinations of these.

Embodiments of the present invention can have one or more files attached to, or otherwise incorporated with, the eyeglasses of the present invention. Although the preferred file comprises a metal nail file, the files used in the present invention need not be limited strictly to metal files, and as such can comprise any material known to those skilled in the art to provide desirable results for filing one's nails.

The present invention relates to eyeglasses, including but not limited to prescription glasses, reading glasses, and sunglasses, designed to fold, slide, or rotate in and out of a case and to be attached to an item via an attachment mechanism. The present invention protects the lenses of the eyeglasses from scratches and abrasions by providing a case which is movably connected to the frame. The frame of the present invention preferably comprises a plurality of individual lenses. It is further preferable that the frame be designed such that the lenses have a spacing substantially similar to that of a user's eyes, thus providing a user with the ability to simultaneously place individual lenses in front of the user's eyes. Further, the present invention prevents loss of the eyeglasses by preferably providing an attachment mechanism. Still further, the present invention provides a compact and readily stowable pair of eyeglasses.

A preferred embodiment of the present invention provides a pair of eyeglasses having leaves, which are optionally used as earpieces, which are wide and foldable in such a manner that, when folded, the leaves form a case which provides protection from scratches and abrasions to the frame of the eyeglasses of the present invention. Another preferred embodiment of the present invention provides a pair of eyeglasses which are foldable into a case and which case comprises a nail file adhered to, incorporated into, or movably positional with respect to the case. Every embodiment of the present invention preferably, though not essentially, comprises an attachment mechanism such that a user is provided the ability to readily secure the eyeglasses to one or more items.

In alternative embodiments, the frame of the eyeglasses may pivot in and out of the case, fold in and out of the case, or slide in and out of the case. Various elements of the present invention can have an assortment of shapes and sizes. The cases of the present invention can include, but are not limited to, any materials which can be fashioned to provide a case, slim line cases, flat cases, oval cases, and any suitable shape or size of case to meet the various size or shape of the glasses. Embodiments of the present invention may include earpiece earpieces. Additionally, embodiments of the present invention may use, but are not limited to, spring mechanisms, slide mechanisms, other mechanisms, or combinations thereof, which enable the frame of the eyeglasses to be movably attached to the case. Further, one or more elements, devices, structures, or components can be optionally provided which facilitate the removal of the frame of the eyeglasses from one of more of the case elements.

Cosmetic designs, logos, emblems, or other such similar elements may be included in the design of the present invention. Any of the above mentioned components may be combined to form alternative embodiments of the present invention.

Reference is now made to the drawings which illustrate the preferred and alternative embodiments of the present invention. FIG. 1A is a drawing depicting an internal view wherein frame 10a is folded inside case 12a, which is preferably a slim line case. The case may comprise aluminum, leather, plastic, acrylic, fabric, metal or other suitable materials. Although, not essential, protrusion 11 is preferably provided to facilitate rotating frame 10a into and out of case 12a. Pivot point 20a connects frame 10a to case 12a in a rotatable fashion, thus allowing frame 10a to pivot in and out of case 12a. Frictional interference is preferably provided such that frame 10a pivots out of case 12a only when an intentional force is applied thereto by a user. Although Attachment mechanism 14 is depicted as residing in its most preferred placement—a terminal portion of case 12a—in every embodiment of the present invention, attachment mechanism 14 can optionally be disposed anywhere on the present invention. Preferably, however, attachment mechanism 14 is disposed in an area which enables a user to easily make use of attachment mechanism 14. FIG. 1B shows how frame 10a preferably pivot out. In FIG. 1C frame 10a are opened and ready to use. FIG. 1D is a front view of frame 10a enclosed in case 12a. A logo design can optionally be disposed on case 12a. Upon reviewing this application, those skilled in the art will recognize that the logo design and placement can be stylistically rearranged on case 12a. In FIG. 1E the back of case 12a is shown with frame 10a enclosed. FIG. 1F shows the top view of closed case 12a from which frame 10a can be seen and accessed. FIG. 1G shows the bottom view of closed case 12a. FIG. 1H shows the left side view of closed case 12a and FIG. 1I shows the right side view of case 12a.

FIG. 2A shows the front view of case 12b, which is preferably a tubular case. Frame 10b is inside case 12b. Slide tab 16 moves (e.g. left to right) while sliding inside of groove 18 which is incorporated into case 12b. Sliding tab 16 within groove 18 enables frame 10b, and thus the lenses, to be exposed. Hinge 17 is optionally provided which enables frame 10b to rotate partially thereabout, thus enabling a user to slide out frame 10b and then swing it down such that it forms substantially a 90 degree angle with case 12b. By doing this, case 12b can function as a handle which enables a user to grasp it and position frame 10b with respect to a user's eyes. FIG. 2B shows the back of tubular case 12b. In this figure, case 12b is closed and contains frame 10b. FIG. 2C is an internal view of frame 10b in case 12b. FIG. 2D shows the front view of tubular case 12b with tab 16 positioned at the far right of groove 18, thus exposing frame 10b for use. End cap 19 is optionally provided and preferably rotates open when frame 10b is slid out of case 12b, and preferably rotates closed when frame 10b is slid into case 12b. FIG. 2E is a top view of frame 10b inside tubular case 12b. FIG. 2F is a bottom view of frame 10b which is disposed within tubular case 12b. FIG. 2G is a left side view of the closed and covered top of tubular case 12b. The top opens and the slide moves as frame 10b moves out of the tubular case 12b. In FIG. 2H the right side of closed case 12b is shown.

FIG. 3A shows a front view of case 12c, which is preferably a flat case. An optional logo is shown in the middle but can be changed or adjusted in location and/or design. Frame 10c, and thus the lenses, are inside case 12c. FIG. 3B shows a back view of case 12c with frame 10c inside. FIG. 3C shows an internal view of a front of case 12c with frame 10c shown inside. Release mechanism 22a is preferably provided. More preferably, release mechanism 22a is positioned beneath a logo. With release 22a positioned behind a logo, release mechanism 22a can be activated by pushing the logo up, down, to one side or another, or inwardly toward an internal portion of case 12c. FIG. 3D shows the front view of case 12c illustrating release mechanism 22a which can be activated as previously described. This action releases frame 10c from case 12c. Although, not essential, protrusion 11 is preferably provided to facilitate rotating frame 10a into case 12c. FIG. 3E shows an opened position of frame 10c. In FIG. 3F a bottom view of closed case 12c is shown. In FIG. 3G the top of case 12c is shown with a view of frame 10c stowed within case 12c. In FIG. 3H the left side view of closed case 12c is shown. In FIG. 3I the right side view of closed case 12c is shown.

FIG. 4A shows the front view of case 12d, which is preferably a flat case. Also shown, release 24a is preferably disposed on a lower end portion of case 12d. In FIG. 4B an internal view of frame 10d inside closed case 12d is shown. Release 24a is preferably a push button release and preferably comprises a simple spring and latch mechanism such that energy from the spring causes frame 10d to rotate out of case 12d when release 24b is pressed. FIG. 4C shows a front view of case 12d with frame 10d being released by a push of release 24a. In FIG. 4D frame 10d are shown in an open position. In this figure, case 12d is disposed in a substantially right angled position with respect to frame 10d. As such, case 12d can be used as a handle for the glasses of the present invention. In FIG. 4E a top view case 12d is shown. As depicted therein, frame 10d preferably fits within a recess disposed within case 12d. FIG. 4F is the bottom view of closed case 12d. FIG. 4G shows the left side view of closed case 12d and FIG. 4H the right side view of closed case 12d.

FIG. 5A shows the front of case 12e, which is preferably substantially flat. FIG. 5B shows an internal view wherein frame 10e, and thus the lenses, are disposed within closed case 12e. FIG. 5C shows an internal side view wherein earpiece 30 of frame 10e is disposed within leaf 26a. When a plurality of leaves 26a and 26a' are folded together, as depicted in FIGS. 5D and E, leaves 26a and 26a' thus form case 12e (see FIG. 5A), which protects frame 10e and the lenses from scratches and abrasions. FIG. 5D shows a top view of case 12e. In this view, earpiece 30' of frame 10e is disposed within a recess of a leaf 26a'. Also depicted in this view, leaf 26a' is folded to cover all or a majority of one side of the lenses of frame 10e. Frame 10e is thus sandwiched between leaves 26a and 26a'. Right earpiece 30 of frame 10e is preferably disposed within a hollow recess of leaf 26a. This leaf is preferably foldable to cover all or a majority of the other side of frame 10e. In FIG. 5E right earpiece 30, disposed within leaf 26a, is depicted in a position where it is partially flipped out from frame 10e. Frame 10e, disposed between leaves 26a and 26a' are now exposed. Leaf 26a' is then brought back to allow frame 10e to be worn. FIG. 5F shows an opened position of frame 10e, with both earpieces 30 and 30' disposed within their respective leaves. One earpiece is preferably pivoted forward and the other is preferably pivoted backward. This shows that frame 10e can be worn with the earpieces still encased within their respective leaves. A user can simply place the leaves above the user's ears. As previously described, it is preferable that leaves 26a and 26a', when pivoted back to their starting position, actually form case 12e. Earpieces 30 and 30' can also optionally be removed from the recesses of their leaves if desired. In so doing, a user can then wear the glasses of the present invention by placing earpieces 30 and 30' above the user's ears. In FIG. 5G the bottom of closed case 12e is shown. In FIG. 5H the left side of closed case 12e is shown. FIG. 5I shows the right side view of closed case 12e.

FIG. 6A shows case 12f containing frame 10f in a closed position. Spring mechanism 24b preferably allows frame 10f to pivot out from a top of case 12f as shown in FIG. 6b. A logo, emblem, or other design for release mechanism 22b is preferably provided and acts as a simple catch mechanism, which catches and retains frame 10f when it is pressed into case 12f. Although it is preferred that catch 22b be a logo, emblem, or other design, any catch will provide desirable results even when release mechanism 22b is not an emblem or logo or any other decorative element. The logo design catch depicted in the figures is depicted in a central portion of case 12f, however, release mechanism 22b can be placed anywhere so long as it is capable of retaining frame within case 12f until activated by a user. In FIG. 6B frame 10f is shown in an open position. Release mechanism 22b can be designed by those skilled in the art such that manipulation of release 22b, in virtually any direction, will activate release 22b and thus allow energy stored in spring mechanism 24b to cause frame 10f to rotate at least partially out of case 12f. In FIG. 6C the top view of case 12f is shown wherein frame 10f is disposed within case 12f. Release 22b can be seen at the top in the middle. In FIG. 6D the bottom of case 12f is shown closed. The catch 22b is shown in the middle. FIG. 6E is an internal view of frame 10f disposed within case 12f. Frame 10f can be affixed at the top or bottom allowing them to pivot from case 12f. FIGS. 6F and 6G show the left side and right side views of closed case 12f respectively.

FIG. 7A shows closed oval case 12g containing frame 10g. Although case 12g is depicted as being substantially oval, case 12g can be any shape that will accommodate storage of folded frame 10g. Combination spring and release mechanism and catch 24c is preferably provided in this embodiment and functions to retain frame 10g within case 12g under spring tension until release mechanism 24C is activated by a user. Although a simple push-button catch is preferable, any catch known to those skilled in the art can provide desirable results. FIG. 7B depicts frame 10g in an open position. In this embodiment, frame 10g is preferably hinged in central portion 32 such that the individual lenses of frame 10g can fold flat against one another. This enables case 12g to be produced in a shortened length. In FIG. 7C the fully opened position of frame 10g is shown. This figure shows frame 10g fully extended with both lenses flipped open and ready to wear. FIG. 7D shows an internal view of frame 10g in closed case 12g. Spring and release mechanism 24c is depicted on a top portion of case 12g and activation the catch preferably enables frame 10g to pivot out of case 12g. FIG. 7E shows a top view of frame 10g in a partially opened position and FIG. 7F shows a top view of frame 10g in a fully opened position. FIG. 7G shows a top view of frame 10g inside case 12g (from this angle frame 10g can be viewed folded inside case 12g). FIG. 7H is the bottom view of frame 10g inside of case 12g. FIG. 7I shows a left side view of closed case 12g and FIG. 7J shows a right side view of closed case 12g.

FIG. 8A shows the front view of case 12h, which is preferably a flat case, with file 34 attached thereto. Although this figure shows file 34 attached to a bottom portion of case 12h, file 34 can be attached virtually anywhere on case 12h and will provide desirable results. Further, file 34 can be integrally incorporated into case 12h. For example, case 12h can have a portion of its surface roughened to create a file-like surface. Also shown, release 24d is preferably disposed on a lower end portion of case 12h. In FIG. 8B an internal view of frame 10h inside closed case 12h is shown. Release 24d is preferably a push button release and preferably a simple spring mechanism is disposed within release 24d such that energy from the spring causes frame 10h to rotate out of case 12h when release 24b is pressed. FIG. 8C shows a front view of case 12h with frame 10h being released by a push of release 24d. In FIG. 8D, frame 10h is shown in an open position. In this figure, case 12h is disposed in a substantially right angled position with respect to frame 10h. As such, case 12h can be used as a handle for the glasses of the present invention. In FIG. 8E a top view case 12h is shown. As depicted therein, frame 10h preferably fits within a recess disposed within case 12h. FIG. 8F is the bottom view of closed case 12h. FIG. 8G shows the left side view of closed case 12h and FIG. 8H the right side view of closed case 12h.

FIG. 9A shows the front view of case 12i, which is preferably a flat case. Also shown, release 24e is preferably disposed on a lower end portion of case 12i. In FIG. 9B an internal view of frame 10i inside closed case 12i is shown. Release 24e is preferably a push button release and preferably a simple spring mechanism is disposed within release 24e such that energy from the spring causes frame 10i to rotate out of case 12i when release 24b is pressed. FIG. 9C shows a front view of case 12i with frame 10i being released by a push of release 24e. As depicted therein, frame 10i preferably has light emitting source 36 disposed between the individual lenses. Light emitting source 36 may be used to provide a reading light, as decoration, or for any other purpose. Although this position on frame 10i is the most preferred, light emitting source 36 can be disposed anywhere on frame 36 and desirable results will be produced. Further, although these figures depict only one light emitting source 36, multiple light emitting sources can be provided, which sources can be bundled together or spaced apart, and will also produce desirable results. Although it is preferred that light emitting source 36 comprise a light emitting diode, any object, element, device, apparatus, or system capable of emitting light can be used and will provide desirable results. Light emitting device 36 can be activated by the press of a button disposed in any location on frame 10i, or case 12i. Optionally light generating source 36 can be automatically activated when frame 10i is pivoted from case 12i. Also, light generating source 36 can optionally be activated when release 24e is pressed. Those skilled in the art will readily recognize that a power source for providing power to light emitting device 36 should be incorporated somewhere on or in the eyeglasses of the present invention. FIGS. 15A-D depict alternative schematic embodiments for producing light in accordance with the present invention. In FIG. 9D frame 10i, with light emitting source 36 disposed thereon, is shown in an open position. In this figure, case 12i is disposed in a substantially right angled position with respect to frame 10i. As such, case 12i can be used as a handle for the glasses of the present invention. In FIG. 9E a top view case 12i is shown. As depicted therein, frame 10i preferably fits within a recess disposed within case 12i. FIG. 9F is the bottom view of closed case 12i. FIG. 9G shows the left side view of closed case 12i and FIG. 9H the right side view of closed case 12i.

FIG. 10A shows a front view of case 12j, which is preferably a flat case. Also shown, release mechanism 24f is preferably disposed on a lower end portion of case 12j. In FIG. 10B an internal view of frame 10j inside closed case 12j is shown. Release 24f is preferably a push button release and preferably a simple spring mechanism is disposed within release 24f such that energy from the spring causes frame 10j to rotate out of case 12j when release 24b is pressed. FIG. 1C shows a front view of case 12j with frame 10j being released by a push of release 24f. As depicted therein, case 12j preferably has light emitting source 36' disposed thereon. Although this figure depicts a particular position on case 12j whereon light emitting source 36' is disposed, light emitting source 36' can be disposed anywhere on an external surface of case 12j and desirable results will be produced. Further, although these figures depict only one light emitting source 36', multiple light emitting sources can be provided, which sources can be bundled together or spaced apart, and will also produce desirable results. Although it is preferred that light emitting source 36' comprise a light emitting diode, any object, element, device, apparatus, or system capable of emitting light can be used and will provide desirable results. Light emitting device 36' can be activated by the press of a button disposed in any location on frame 10*j*, or case 12*j*. Optionally light generating source 36' can be automatically activated when frame 10*j* is pivoted from case 12*j*. Also, light generating source 36' can optionally be activated when release 24*f* is pressed. As mentioned above, FIGS. 15A-D depict alternative schematic embodiments for producing light in accordance with the present invention. Those skilled in the art will readily recognize that a power source, such a s battery, will necessarily need to be incorporated into the glasses of the present invention such that power can be supplied to the one or more light emitting devices 36'. In FIG. 10D frame 10*j* is shown in an open position wherein case 12*j* has light emitting source 36' disposed on a front surface thereof. In this figure, case 12*j* is disposed in a substantially right angled position with respect to frame 10*j*. As such, case 12*j* can be used as a handle for the glasses of the present invention. In FIG. 10E a top view case 12*j* is shown. As depicted therein, frame 10*j* preferably fits within a recess disposed within case 12*j*. FIG. 10F is the bottom view of closed case 12*j*. FIG. 10G shows the left side view of closed case 12*j* and FIG. 10H the right side view of closed case 12*j*.

FIG. 11A shows the front of case 12*k*, which is preferably substantially flat. FIG. 11B shows an internal view wherein frame 10*k* is disposed within closed case 12*k*. FIG. 11C shows an internal side view wherein earpiece 30 is disposed within leaf 26*b*. When a plurality of leaves 26*b* and 26*b'* are folded together, as depicted in FIGS. 5D and E, leaves 26*b* and 26*b'* thus form case 12*k* (see FIG. 11A), which protects the lenses of frame 10*k* from scratches and abrasions. FIG. 11D shows a top view of case 12*k*. In this view, earpiece 30' of frame 10*k* is formed from, or fixedly secured within leaf 26*b'*. Also depicted in this view, leaf 26*b'* is folded to cover a top of frame 10*k*. The lenses of frame 10*k* are thus sandwiched between leaves 26*b* and 26*b'*. Right earpiece 30 of frame 10*k* is preferably part of, or fixedly secured within leaf 26*b*. This leaf is preferably foldable to cover a bottom of frame 10*k*. In FIG. 11E right earpiece 30, incorporated within, or attached to leaf 26*b*, is depicted in a position where it is partially flipped out from a top of frame 10*k*. The lenses of frame 10*k*, disposed between leaves 26*b* and 26*b'* is now exposed. Leaf 26*b'* is then brought back to allow the eyeglasses of the present invention to be worn. FIG. 11F shows the fully opened position of frame 10*k*, with both earpieces 30 and 30' incorporated within their respective leaves. One earpiece is preferably pivoted forward and the other is preferably pivoted backward. This shows that frame 10*k* can be worn by a user by allowing the leaves to rest upon the user's ears. As previously described, it is preferable that leaves 26*b* and 26*b'*, when pivoted back to their starting position, actually form case 12*k*. In FIG. 11G the bottom of closed case 12*k* is shown. In FIG. 11H the left side of closed case 12*k* is shown. FIG. 5I shows the right side view of closed case 12*k*.

FIG. 12A shows the front of case 12*l*, which is preferably substantially flat. FIG. 12B shows an internal view wherein frame 10*l* is disposed within closed case 12*l*. FIG. 12C shows an internal side view wherein earpiece 30 of frame 10*l* is disposed within leaf 26*c*. When a plurality of leaves 26*c* and 26*c'* are folded together, as depicted in FIGS. 5D and E, leaves 26*c* and 26*c'* thus form case 12*l* (see FIG. 12A), which protects the lenses of frame 10*l* from scratches and abrasions. FIG. 12D shows a top view of case 12*l*. In this view, earpiece 30' is formed from, or fixedly secured within leaf 26*c'*. Also depicted in this view, leaf 26*c'* is folded to cover a top of frame 10*l*. The lenses of frame 10*l* are thus sandwiched between leaves 26*c* and 26*c'*. Right earpiece 30 is preferably part of, or fixedly secured within leaf 26*c*. This leaf is preferably foldable to cover a bottom of frame 10*l*. In FIG. 12E right earpiece 30, incorporated within, or attached to leaf 26*c*, is depicted in a position where it is partially flipped out from a top of frame 10*l*. The lenses of frame 10*l*, disposed between leaves 26*c* and 26*c'* are now exposed. Leaf 26*c'* is then brought back to allow the eyeglasses of the present invention to be worn. FIG. 12F shows an open position of frame 10*l*, with both earpieces 30 and 30' incorporated within their respective leaves. This figure best depicts the preferred shape of leaves 26*c* and 26*c'* for this embodiment. As best depicted therein, leaves 26*c* and 26*c'* are preferably hooked or otherwise curved on their terminal end. This shape better enables the glasses of the present invention to stay on a user because the hooked shaped ends of leaves 26*c* and 26*c'* preferably wrap around behind a user's ear when the glasses of this embodiment are properly worn. One earpiece is preferably pivoted forward and the other is preferably pivoted backward. This shows that frame 10*l* can be worn by a user by allowing the leaves to rest upon the user's ears and curve behind the ears. As previously described, it is preferable that leaves 26*c* and 26*c'*, when pivoted back to their starting position, actually form case 12*l*. In FIG. 12G the bottom of closed case 12*l* is shown. In FIG. 12H the left side of closed case 12*l* is shown. FIG. 5I shows the right side view of closed case 12*l*.

FIG. 13A shows the front view of case 12*m*, which is preferably a flat case. Also shown, pivot point 20*b* is preferably disposed on a lower end portion of case 12*m*. In FIG. 13B an internal view of frame 10*m* inside closed case 12*m* is shown. FIG. 13C shows a front view of case 12*m* with frame 1O*m* and file 38 pivotally connected to case 12*m* via pivot point 20*b*. In FIG. 13D frame 10*m* is shown in an open position with respect to case 12*m*. In this figure, case 12*m* is disposed in a substantially right angled position with respect to frame 10*m*. As such, case 12*m* can be used as a handle for the glasses of the present invention. In FIG. 13E a top view case 12*m* is shown. As depicted therein, frame 10*m* preferably fits within a recess disposed within case 12*m*. FIG. 13F is the bottom view of closed case 12*m*. FIG. 13G shows the left side view of closed case 12*m* and FIG. 13H the right side view of closed case 12*m*.

FIG. 14A shows the front of case 12*n*, which is preferably substantially flat. FIG. 14B shows an internal view wherein frame 10*n* is disposed within closed case 12*n*. FIG. 14C shows an internal side view wherein earpiece 30 is disposed within leaf 26*d*. When a plurality of leaves 26*d* and 26*d'* are folded together, as depicted in FIGS. 5D and E, leaves 26*d* and 26*d'* thus form case 12*n* (see FIG. 14A), which protects frame 10*n* from scratches and abrasions. FIG. 14D shows a top view of case 12*n*. In this view, earpiece 30' of frame 10*n* is formed from, or fixedly secured within leaf 26*d'*. Also depicted in this view, leaf 26*d'* is folded to cover a top of frame 10*n*. Frame 10*n* is thus sandwiched between leaves 26*d* and 26*d'*. Right earpiece 30 of frame 10*n* is preferably part of, or fixedly secured within leaf 26*d*. This leaf is preferably foldable to cover a bottom of frame 10*n*. In FIG. 14E right earpiece 30, incorporated within, or attached to leaf 26*d*, is depicted in a position where it is partially flipped out from a top of frame 10*n*. The lenses of frame 10*n*, disposed between leaves 26*d* and 26*d'* are now exposed. Leaf 26*d'* is then brought back to allow frame 10*n* to be worn. As best depicted in FIG. 14F, which shows the fully opened position of frame 10*n*, with both earpieces 30 and 30' incorporated within their respective leaves, file 40 preferably is fixedly attached to, or otherwise incorporated into one or both of leaves 26*d* and 26*d'*. One earpiece is preferably pivoted forward and the other is preferably pivoted backward. This shows that frame 10*n* can be worn with by a user, allowing the leaves to rest upon the user's ears. As previously described, it is preferable that leaves 26*d* and 26*d'*, when pivoted back to their starting position, actually form case 12*n*. In FIG. 14G the bottom of closed case 12*n* is shown. In FIG. 14H the left side of closed case 12*n* is shown. FIG. 5I shows the right side view of closed case 12*n*.

Figure 15D:
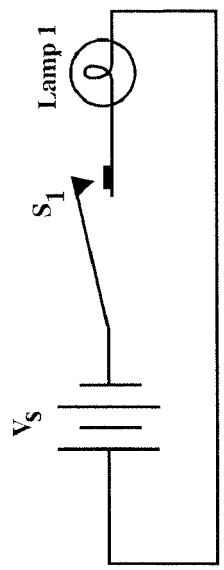
Figure 15A:
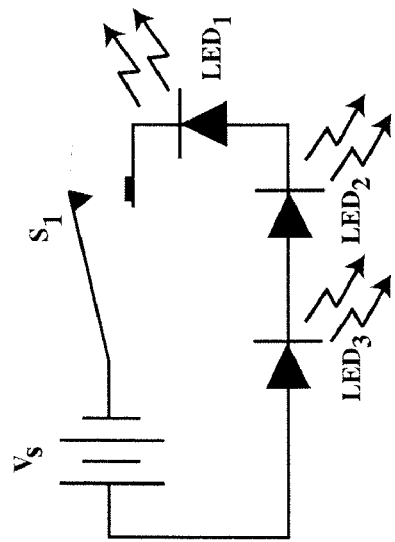
Figure 15C:
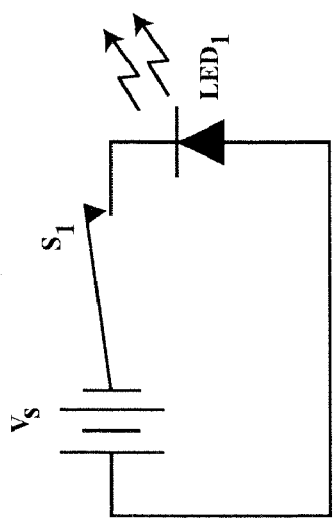

FIG. 15A shows a schematic representation for a circuit which can be incorporated into one or more embodiments of the present invention, such that a single Light Emitting Diode (LED) can be illuminated in accordance with the above teachings. FIG. 15B shows a schematic representation for a circuit which can be incorporated into one or more embodiments of the present invention such that a plurality of LEDs can be illuminated in accordance with the above teachings. FIG. 15C shows a schematic representation for a circuit which can be incorporated into one or more embodiments of the present invention, such that a single illuminating lamp can be illuminated in accordance with the above teachings. FIG. 15D shows a schematic representation for a circuit which can be incorporated into one or more embodiments of the present invention such that a plurality of illuminating lamps can be illuminated in accordance with the above teachings.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A combination eyeglasses and case comprising:
    a frame comprising one or more lenses; and
    two leaf members pivotally connected to said frame, said leaf members sufficiently large to cover a majority of each of said lenses;
    wherein each of said leaf members encloses an earpiece and is removable from said earpiece.

2. The combination eyeglasses and case of claim 1 wherein a first said leaf members is pivotable to cover a majority of a front surface of each of said lenses and a second said leaf member is pivotable to cover a majority of a rear surface of each of said lenses.

3. The combination eyeglasses and case of claim 1 wherein said lenses are sufficiently short in height so a majority of said lenses is coverable by said leaf members.

4. The combination eyeglasses and case of claim 1 wherein each of said leaf members comprises an earpiece.

5. The combination eyeglasses and case of claim 4 wherein each said leaf member or each said earpiece comprises an angled end disposable behind an ear of a wearer.

6. The combination eyeglasses and case of claim 1 further comprising an element selected from the group consisting of file, light emitting source, and attachment mechanism.

7. The combination eyeglasses and case of claim 6 wherein said file is incorporated into a surface area of at least one leaf member.

8. The combination eyeglasses and case of claim 6 wherein said attachment mechanism comprises a key ring.

9. A method for storing eyeglasses, the method comprising the steps of:
    providing a frame comprising one or more lenses;
    connecting two pivoting leaf members to the frame;
    incorporating a file into a surface area of at least one leaf member;
    folding a first leaf member to cover a majority of a front surface of each of the lenses; and
    folding a second leaf member to cover a majority of a rear surface of each of the lenses.

10. The method of claim 9 further comprising the steps of unfolding the leaf members and placing the leaf members on a user's ears.

11. The method of claim 9 further comprising the step of attaching an attachment mechanism to the frame.

12. A combination eyeglasses and case comprising:
    a frame comprising one or more lenses; and
    two leaf members pivotally connected to said frame, said leaf members sufficiently large to cover a majority of each of said lenses; and
    a file incorporated into a surface area of at least one leaf member.

13. The combination eyeglasses and case of claim 12 wherein a first said leaf members is pivotable to cover a majority of a front surface of each of said lenses and a second said leaf member is pivotable to cover a majority of a rear surface of each of said lenses.

14. The combination eyeglasses and case of claim 12 wherein said lenses are sufficiently short in height so a majority of said lenses is coverable by said leaf members.

15. The combination eyeglasses and case of claim 12 wherein each of said leaf members comprises an earpiece.

16. The combination eyeglasses and case of claim 15 wherein each said leaf member or each said earpiece comprises an angled end disposable behind an ear of a wearer.

17. The combination eyeglasses and case of claim 12 wherein each of said leaf members encloses an earpiece.

18. The combination eyeglasses and case of claim 17 wherein said leaf members are removable from said earpieces.

19. The combination eyeglasses and case of claim 12 further comprising a light emitting source or an attachment mechanism.

20. The combination eyeglasses and case of claim 19 wherein said attachment mechanism comprises a key ring.

* * * * *